(12) United States Patent
Gross

(10) Patent No.: US 7,305,982 B2
(45) Date of Patent: Dec. 11, 2007

(54) RAPID IGNITION AIR ASSISTED CHARCOAL GRILL WITH WASTE DISPOSAL

(76) Inventor: James Lee Gross, 1057 E, Imperial Hwy., #115, Placentia, CA (US) 92870

( * ) Notice: Subject to any disclaimer, the term of this patent is extended or adjusted under 35 U.S.C. 154(b) by 334 days.

(21) Appl. No.: 10/871,859

(22) Filed: Jun. 17, 2004

(65) Prior Publication Data

US 2006/0124120 A1 Jun. 15, 2006

Related U.S. Application Data

(63) Continuation-in-part of application No. 10/769,363, filed on Jan. 29, 2004, now abandoned, which is a continuation-in-part of application No. 10/448,010, filed on May 29, 2003, now abandoned.

(51) Int. Cl.
*A47J 37/07* (2006.01)
*A47J 37/00* (2006.01)
(52) U.S. Cl. .................................. 126/25 B; 126/25 R
(58) Field of Classification Search .............. 126/25 R, 126/25 B, 36, 242, 532, 542; 99/339
See application file for complete search history.

(56) References Cited

U.S. PATENT DOCUMENTS

| | | | | |
|---|---|---|---|---|
| 1,295,907 A | * | 3/1919 | Le Compte | 431/208 |
| 1,611,018 A | * | 12/1926 | Fuller | 126/242 |
| 1,826,067 A | * | 10/1931 | Gercich et al. | 126/36 |
| 1,887,768 A | * | 11/1932 | Maloney | 126/242 |
| 2,234,788 A | * | 3/1941 | Williams | 141/91 |
| 2,866,883 A | * | 12/1958 | Borden | 126/25 B |
| 2,950,669 A | * | 8/1960 | Terry | 99/421 H |
| 3,033,191 A | * | 5/1962 | Bonadiman | 126/25 B |
| 3,159,119 A | * | 12/1964 | Hottenroth et al. | 126/25 B |
| 3,306,279 A | * | 2/1967 | Dale | 126/25 A |
| 3,327,697 A | | 6/1967 | Berlant | |
| 3,329,529 A | * | 7/1967 | Lamar | 134/22.18 |
| 3,373,754 A | * | 3/1968 | Squire | 134/58 D |
| 3,413,935 A | * | 12/1968 | Behrns | 126/25 B |
| 3,416,514 A | * | 12/1968 | Klemme | 126/242 |
| 3,498,211 A | * | 3/1970 | Atkins | 99/443 R |

(Continued)

*Primary Examiner*—Carl D. Price
(74) *Attorney, Agent, or Firm*—Norton R. Townsley; Belasco Jacobs & Townsley, LLP

(57) ABSTRACT

The present invention is a cooking grill having as its cooking fuel source charcoal, wood, or similar solid fuels and comprised of devices for acceleration of ignition and temperature elevation of the solid fuels so as to lessen cooking preparation time and increase cooking efficiency of said grill. The invention is directed to a barbecue unit capable of accelerated ignition and burn time of charcoal, wood chip, or similar fuel. The unit is comprised of an accelerated ignition system having an ignition box, heating element, plurality of transportable fuel baskets, basket transfer tool, high-pressure forced air supply device, automatic sequenced timer, and ignition air diverter. The unit is further comprised of supporting racks affixed to the shell of the unit and operable to hold the transportable fuel baskets in a plurality of configurations such that heat can be applied directly or indirectly in the cooking of the food. In addition, the barbecue unit of the present invention is comprised of a waste removal system for clean up of the unit after cooking, said waste removal system being capable of processing and disposing of ash, grease, food, and other waste remaining in the unit after the cooking.

45 Claims, 13 Drawing Sheets

U.S. PATENT DOCUMENTS

| | | | |
|---|---|---|---|
| 3,909,291 A * | 9/1975 | Leong | 134/115 G |
| 3,933,145 A * | 1/1976 | Reich | 126/25 R |
| 3,991,666 A * | 11/1976 | Tidwell et al. | 99/446 |
| 4,133,335 A * | 1/1979 | Malafouris | 126/9 R |
| 4,190,034 A * | 2/1980 | Wonisch | 126/25 B |
| 4,524,751 A * | 6/1985 | Hoglund | 126/25 A |
| 4,807,590 A * | 2/1989 | Evans | 126/242 |
| 4,995,137 A * | 2/1991 | Reichborn | 15/327.1 |
| 5,531,154 A | 7/1996 | Perez | |
| 5,785,046 A | 7/1998 | Colla | |
| 6,182,559 B1 | 2/2001 | Chiang | |
| 6,223,737 B1 * | 5/2001 | Buckner | 126/25 R |
| 6,631,712 B2 * | 10/2003 | Koncelik, Jr. | 126/25 C |
| 2002/0005194 A1 | 1/2002 | Trogolo et al. | |
| 2003/0015187 A1 * | 1/2003 | Koncelik | 126/25 C |

* cited by examiner

RAPID IGNITION AIR ASSISTED CHARCOAL GRILL WITH WASTE DISPOSAL

CROSS REFERENCES

U.S. Patent Documents

The present invention is the continuation-in-part of regular patent application Ser. No. 10/769,363, filed Jan. 29, 2004, now abandoned. Said application Ser. No. 10/769,363 is itself the continuation-in-part of regular patent application Ser. No. 10/448,010, filed May 29, 2003, now abandoned.

BACKGROUND OF THE INVENTION

This invention relates generally to the field of outdoor grills and barbecue units.

More specifically, this invention is directed to a barbecue unit capable of accelerated ignition and burn time of charcoal, wood chip, or similar fuel, said accelerated ignition system comprised of an ignition box or firebox, heating element, plurality of fuel baskets, basket transfer tool, high-pressure forced air supply device, automatic sequenced timer, and ignition air diverter. This invention is further capable of supporting fuel baskets in a plurality of configurations such that heat can be applied directly or indirectly in the cooking of the food. In addition, the barbecue unit of the present invention provides a waste removal system for clean up of the unit after cooking, said waste removal system capable of processing and disposing of ash, grease, food, and other waste left in the unit after the cooking process is completed.

In recent times, many improvements have been made to barbecue grills. Gas barbecue grills provide faster cooking time and steady temperature control; however, they cannot provide the charcoal or wood flavor that many people prefer and associate with barbecued food. Different mechanisms have been utilized to supply forced air into existing charcoal barbecue units to control temperature, but none of these inventions have included the features needed for efficient charcoal or wood barbecue cooking, namely accelerated ignition and adequate air supply directed toward the fuel. Charcoal and wood fuels are useful for slow-burn qualities because they maintain a high temperature with efficiency of fuel for a lengthy time, but only after said fuel has been burning for a significantly long ignition time. This invention answers the dilemma of the time delay required to take advantage of the slow-burn qualities of said fuel by providing an ignition system that heats the charcoal to flash point with continued air induction being diverted beneath the coals to accelerate the burn time after ignition.

The accelerated ignition system of the present invention consists of a heating element in combination with an air blower. Said heating element may be electrical coils or a propane or natural gas burner. Said air blower consists of a device that supplies forced air at a high volume and pressure to shorten the time required to elevate the temperature of the fuel to a degree suitable for cooking. Ignition is effected inside an ignition box or firebox contained within the barbecue unit. The charcoal or wood fuel is held in baskets in the ignition box, which baskets are transferable after ignition by use of a tool for picking them up and moving them to a plurality of basket support racks. Said racks are sized and positioned so that the baskets can be placed for indirect and direct cooking at the preference of the barbecue operator.

Additionally, the present invention incorporates a waste disposal unit for cleanup functions, which disposal unit is integrated into the unit to be easily and immediately accessible for cleaning the unit and to be operable with a minimal amount of labor on the part of the operator. Said waste disposal unit consisting of a garbage disposal and a wet and dry vacuum for cleaning the unit without having to remove or disassemble the lower part of the barbecue shell where waste tends to accumulate during the cooking process. The waste disposal unit is further designed so as to be integrated into the design of the present invention as a whole, maintaining the integrity of the design for marketability and manufacturing purposes.

The present invention is operable as portrayed, but it is understood that it will most usually be located on a stand. Many types of stands are known in the prior art. Stands may be rigid, such as often is encountered in built-in grills: table tops, countertops, and the like, generally with fire-resistant surfaces such as tile or other ceramic or synthetic base. Alternatively stands may be freestanding, as in carts and metal stands. Such stands often have wheels, imparting portability to the grill.

The present invention is envisioned to work in concert with a variety of stands, both freestanding and built-ins, but no stand is predetermined for the present invention. Often stands are custom designed for each customer, and thus cannot be anticipated. Nevertheless, the present invention is designed to work with all types of stands that are designed for conventional barbecue grills. The integrated waste disposal unit of the present invention improves the capability of the operator to clean and maintain the unit in any kind of stand, whether an in-built counter or a portable wheeled base, by making removable the debris that tends to accumulate in the lower interior by a means that is operable from the exterior without having to disassemble the shell of the unit.

DESCRIPTION OF THE RELATED ART

Prior art has continued to try to develop barbecue grills that improve the efficiency of cooking over a flame, the primary difficulties being maintaining a steady temperature, efficient ignition and heating in an outdoor setting, and cleaning carbon and food remnants from the deep fire basin of the grill.

U.S. Pat. No. 2,691,368 to A. J. Hood discloses a barbecue unit which utilizes a regulated forced draft to simplify the igniting process and is also used to some extent during cooking process.

U.S. Pat. No. 4,823,684 to Traeger et al. discloses a barbecue unit which utilizes an electric gear motor, mounted to the unit and with an output shaft connected.

U.S. Pat. No. 4,209,006 to Marsalko discloses a barbecue unit which utilizes a set of controllable louvered openings and a set of uncontrollable openings in combination with a forced air draft device for directing air through the openings and onto the substance being barbecued.

U.S. Pat. No. 5,176,124 to Wrasse discloses a barbecue unit that utilizes a forced air blower to provide sufficient oxygen to the firebox.

None of the above cited art nor any art discovered discloses a barbecue unit displaying an accelerated ignition unit comprised of a combined heating element and forced air supply and a separate inducted air supply system for maintaining cooking temperature. Nor do any disclose the use of a garbage disposal and vacuum unit for waste removal. In view of the inefficiencies of prior barbecue grills, a purpose of the present invention is to provide improved ignition of charcoal and wood fuel, accelerated and continued burn at cooking temperature, and easy removal of ash and remnants.

Other objects and advantages of the present invention will become apparent from the following descriptions, taken in connection with the accompanying drawings, wherein, by way of illustration and example, an embodiment of the present invention is disclosed.

SUMMARY OF THE INVENTION

The primary object of the invention is to deliver an outdoor grill and barbecue cooker that utilizes the advantages of charcoal and wood cooking while making the ignition and cooking processes more efficient and facilitating waste removal.

Another object of the invention is to provide a way to grill with charcoal or wood without the inherent drawbacks of barbeque grills that utilize charcoal or wood fuel, said drawbacks being inefficiency in cooking time arising from the slow ignition and slow burn qualities of fuel and problematical clean up of grills arising from the ashes, grease, carbon, and other residue left in the interior of the unit.

Another object of the invention is to hasten the combustion of the fuel by igniting the coals, which are placed in a plurality of baskets in a firebox within the unit, to flash point and accelerated burn by use of a combined heating element and high-pressure and high-volume forced air device.

Another object of the invention is to provide a method for and maintaining cooking temperature with a continued use of forced air at a low pressure to provide suitable ambient air supply directable by means of air flow diverters to supply the demand for air that burning charcoal or wood requires, especially in an enclosed environment where there is less than an adequate supply of air.

Another object of the invention is to attain different charcoal cooking temperatures by providing racks in a plurality of sizes, said racks serving to support the fuel baskets filled with hot coals after ignition, and said fuel baskets being capable of placement on said racks in a plurality of positions such that the baskets may be placed together to achieve intense heat in one location or apart to achieve less intense heat, otherwise referred to herein as direct (intense) or indirect (less intense) cooking.

Another object of the invention is to provide an integrated method for ease of cleanup after grilling, which method is inexpensive to manufacture, easy to assemble, and simple to use.

Other objects and advantages of the present invention will become apparent from the following descriptions, taken in connection with the accompanying drawings, wherein, by way of illustration and example, an embodiment of the present invention is disclosed.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

Figure 1:
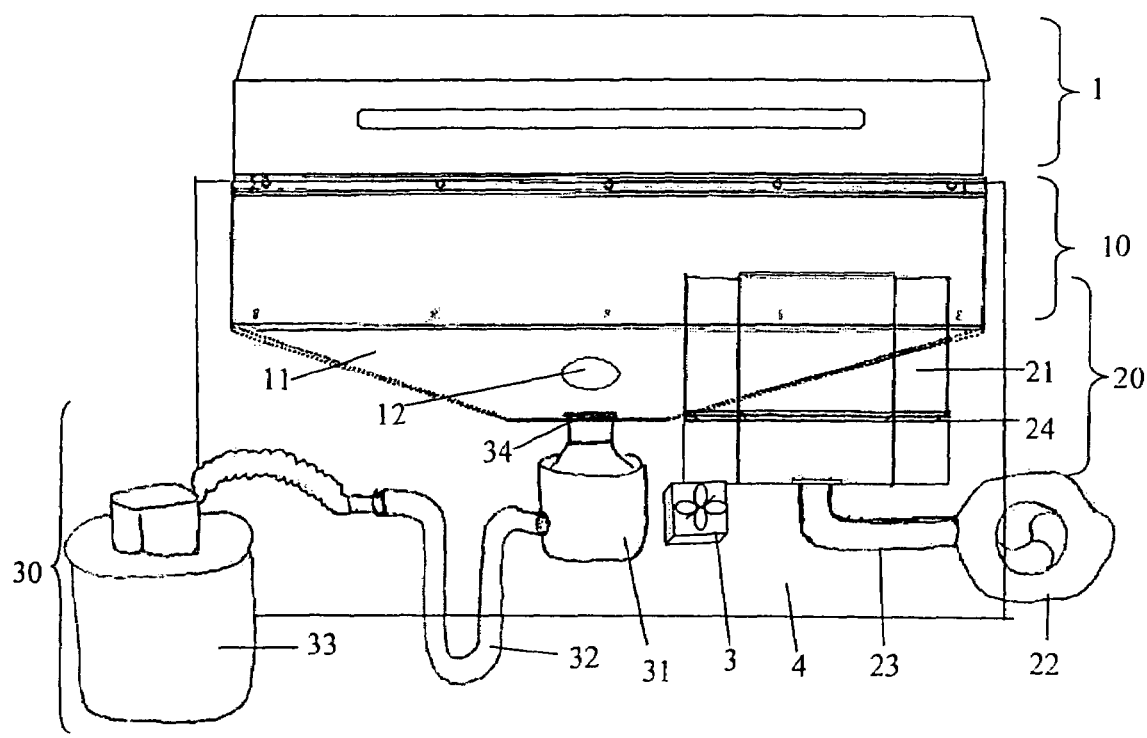
FIG. 1 is a partial cutaway front view of the top and base shell of the present invention showing the ignition, cooking, and waste removal components.

Referring now to FIG. 1, we see a front view of the present invention. For convenience of reference, the present invention is discussed in terms of having three overall functions: 1) ignition; 2) cooking; and 3) cleanup.

In this view, the lid (1) and the base (10) of the barbecue shell are shown, the base of the shell being where the cooking function occurs. The shell is preferably disposed in a stand (4), which may be a permanent structure or portable. The sloped bottom of the shell base (11) is pierced by two low-pressure forced air intake apertures (12) for allowing ambient air to flow into the cooking area beneath the burning coals, said air being drawn in by the rising of the fire-heated air. Said air intake aperture must be of a size that permits air intake to feed the fire sufficiently in order to accelerate the burn and maintain cooking temperature, and it may be fed by means of a low-pressure forced air device (3). A second air intake aperture is provided through the opposite sloping base, as can be better seen in FIG. 3. The sloping design of the bottom of the shell base (11) is particularly significant for purposes of cleaning, as this design allows the waste from cooking to flow by gravity, aided by water or other liquid, toward the center of the bottom of the barbecue shell base, where the waste collects and passes into the waste removal unit (30).

A partial cutaway of the base of the barbecue shell is displayed in FIG. 1 to show the ignition functionality of the system (20), and specifically illustrating the ignition box (firebox) (21), which is affixed into the base shell and the forced air supply, comprised of an air blower (22) and a conduit (23). Said blower can be any suitable type of ventilating air blower. Suitable examples include, but are not limited to, the 3-speed Blue Blower (part number 333797 from Northern® Tool & Equipment Co.) and the 8 in. single-phase utility blower (part number 177770 from Northern® Tool & Equipment Co.). Said conduit can be any type of pipe, and it attaches at the base of the firebox housing and extends toward to side of the grill so that the air blower can be held or attached into position without being immediately in contact with the firebox. The ignition system is further described in FIGS. 5 and 7

The third functionality of the present invention is the waste removal system (30). This component system is illustrated in FIG. 1 as being comprised of a garbage disposal (31), a conduit (32) and a shop vacuum (33). The garbage disposal (31) is a typical heavy-duty disposal. Suitable examples include, but are not limited to, the Insinkerator® model 777ss® available from Emerson®, and the Kenmore extra heavy duty waste disposal (part number 04260556000 from Sears, Roebuck & Co. After waste is processed through the disposal, it floxws through a conduit (32) into a shop vacuum (33). This is a wet or dry vacuum unit, as is often used in outdoor environments. A suitable, non-limiting example is the Shop-Vac® Contactor model number 601-10-00, available from the Shop-Vac company.

The method of the present invention can be best described with reference to FIG. 1. A barbecue chef would commence the barbecue procedure by plugging the intake top of the disposal (31) opening (34) inside the lower base of the shell, removing any plugs left in the air intake apertures (12) during a prior cleaning procedure. The chef would then prepare the charcoal by placing the coals into perforated fuel baskets, as described in FIG. 8, and setting them into the firebox housing (21), which housing is attached as a single integral unit to the shell. The lid of the barbecue shell is then preferably closed (for safety reasons), and the heating element is turned on using controls at the front of the firebox housing (21) (not visible in this frontal view). As the temperature rises to ignition point, the forced air blower (22) is started, the air is conducted through a conduit (23) and is diverted to flow upwards through each burner to the charcoal or wood (see further description for FIG. 5). The combination of intense air and heat cause the coal to reach flash point and burst into flame.

Figure 9:
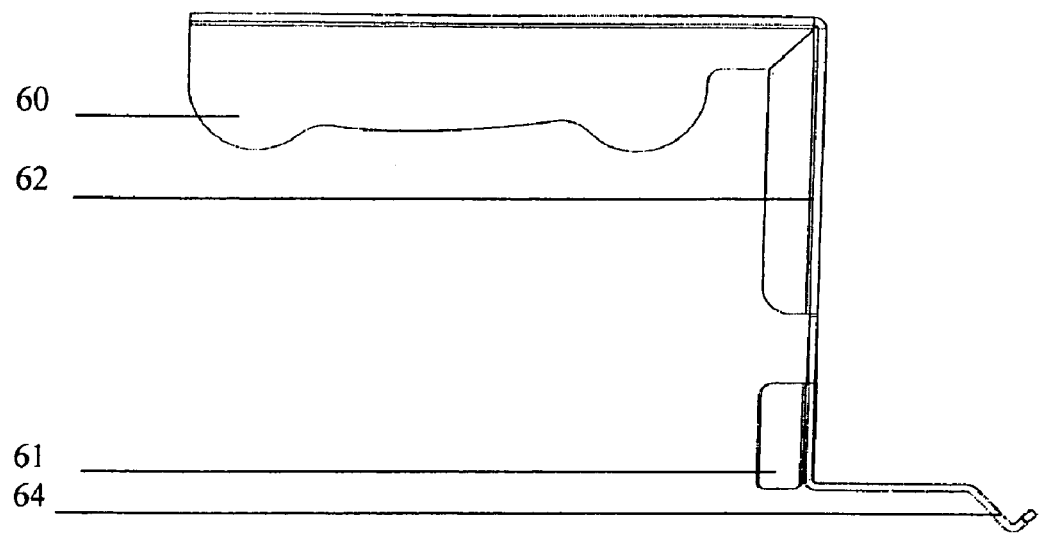
FIG. 9 shows the basket transfer tool from a side view.
Figure 11:
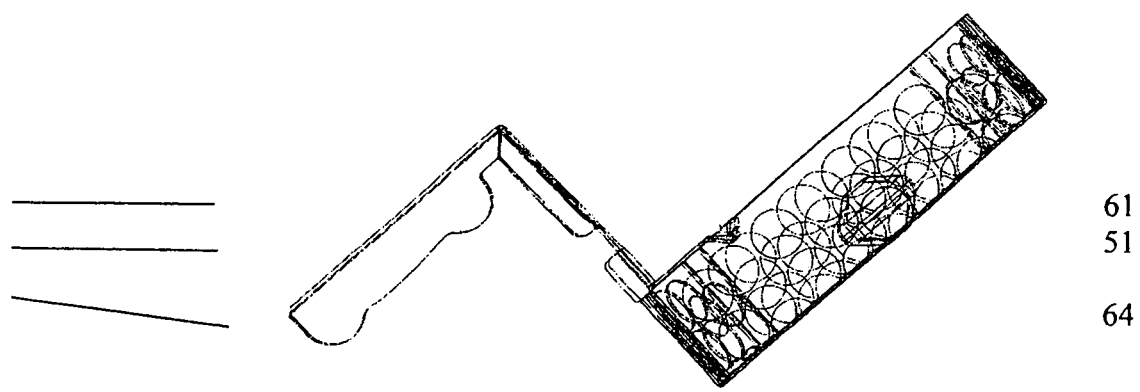
FIG. 11 illustrates use of the basket transfer tool from a side view.

With the coals burning merrily, the forced air blower (22) can be turned off, at which point the chef, who has already prepared the food for cooking, opens the lid (1) of the barbecue shell and prepares to transfer the fuel baskets from the firebox (21) into positions for cooking. The transfer is made by using a tool, as illustrated in FIGS. 9 and 11. The chef picks up one basket at a time and moves them into the position desired on the interior support racks. If the chef desires intense heat to be directed onto the food, the chef positions two or more of the fuel baskets onto the large perforated support rack, sets one or more food cooking grates onto the top supporting rails (see FIG. 16), and places the food directly over the fuel baskets on the perforated support rack. If indirect cooking is preferred, the chef may spread the fuel baskets apart, positioning them on the small perforated racks and in the far corners of the large perforated support rack (see FIG. 15) as desired. The food may then be placed on cooking grates that are not directly over the coals, or it may be placed on a spit rotisserie that is secured through insets or apertures in the sides of the lid above the grates. The lid of the barbecue shell may be left open or may be closed while cooking. During the cooking process, the fire will continue to draw air from underneath the support racks, which process is made more efficient by means of air intake apertures (12) on the front and rear sloping panels (11) of the barbecue shell in combination with an interior air diverter (see FIGS. 18 and 19). In another embodiment, particularly preferable when the barbecue shell is placed into an enclosed stand, the air supply available through the air intake apertures can be assisted by fans operating at aperture vents in the stand.

The cooking procedure tends to allow ash, food remnants, grease, and other waste materials to drop and collect in the bottom of the barbecue shell (11). After the cooking procedure is finished and the barbecue has cooled, the waste removal procedure can begin. In this procedure, the person cleaning the barbecue can slide out of the front side at the base of the firebox an ashtray (24) used to catch any remnants from the ignition and cooking procedures that might have fallen into the housing (see FIG. 5). The cleaner can further remove the plug from the top of the disposal unit (34) and replace each plug in each air intake aperture (12). The cleaner may then rinse the interior of the shell with liquid, processing the charcoal, remnants, and liquid through the disposal (31). The conduit from the disposal (32) is U-shaped and the side farthest from the disposal is higher than the side closest to it so as to operate like a plumbing trap for purposes of regulating the liquid flow. FIG. 1 shows the conduit removably connected to a hose from a shop vacuum (33), which is a typical wet and dry vacuum. The vacuum can be useful during the cleaning process if used to suck the waste through the hose and conduit. It can also be disconnected from the conduit and the waste collected in the vacuum can be dumped out. In another embodiment of this invention, the conduit (32) may be connected directly to a plumbing system and the waste processed in the garbage disposal can then be flushed down the drain.

Figure 2:
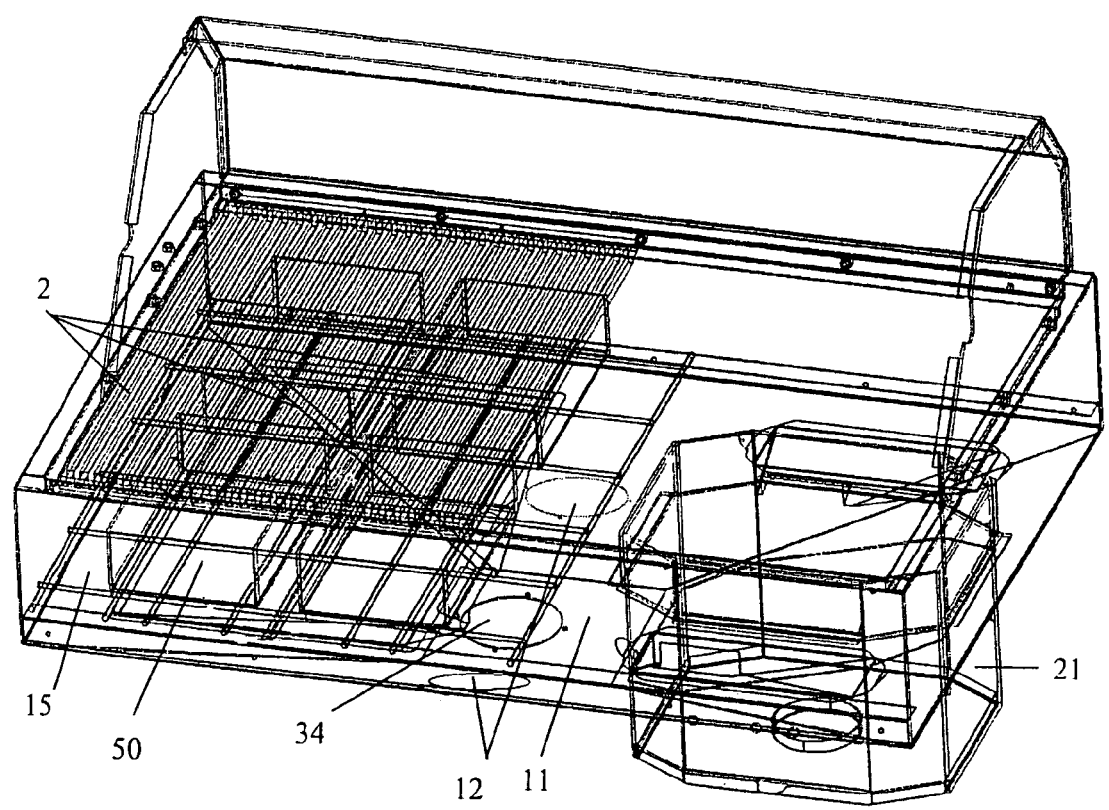
FIG. 2 is a perspective cutaway frontal view of the present invention showing the barbeque unit with cooking fuel baskets positioned on the support rack under the food cooking grill.

FIG. 2 shows a perspective view of the barbecue shell, firebox (21), fuel baskets (50), and food cooking grates (2). A plurality of grates (2) may be placed across the opening of the unit on support brackets, which grates serve as the surface for cooking food. This illustration shows three grates (2) that are placed adjoining each other. The grates are placed on the grill after the fuel baskets (50) have been positioned on the support racks (15) in the center cooking area of the grill. In this illustration, the fuel baskets (50) are all placed directly below the food cooking grates (2), in which event cooking will be direct and rapid. In this Figure, the sloped base of the shell (11), the aperture for the waste disposal unit (34), and the apertures for air Supply (12) can also be seen.

Figure 3:
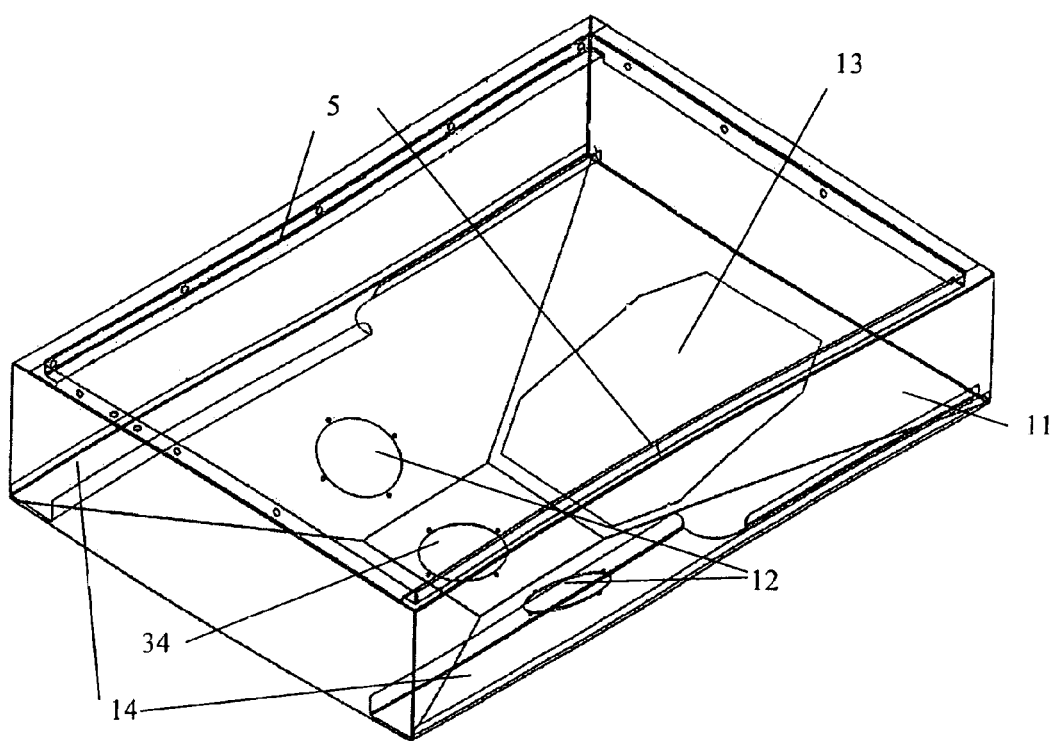
FIG. 3 is a cutaway perspective view of the lower half of the barbecue shell showing the interior of the cooking area.

FIG. 3 is an illustration of the interior of the cooking area of the lower half of the barbecue shell from a cutaway, perspective view. In this figure, the base of the shell is shown to slope toward the horizontal bottom at the center (1). At the bottom center is an aperture through the shell where the disposal unit is connected (34). To either side of the center aperture are two additional apertures through the shell.

These are the ambient air intake apertures (12) through which air supply is drawn from the exterior of the shell into the interior of the cooking area as the heat rises from the charcoal, thereby feeding the fire with constant air flow to maintain cooking temperature. The large, oblong, octagon (13) is also an aperture in the sloped bottom of the shell, this aperture being for insertion of the firebox. When inserted into this apertures the upper rim of the firebox will protrude upwards into the cooking area to the height required for the support rails affixed to the firebox (see FIG. 4) to correspond in the same horizontal plane as the support rails attached to the interior wall of the shell (14). The interior support wall rails (14), in correspondence with the firebox support rails, are capable of holding perforated support racks on which the fuel baskets are placed during the cooking procedure subsequent to the ignition procedure (see FIGS. 12 trough 15). The firebox is welded or otherwise immovably attached to the shell at said height. The grates where food is placed for cooking are supported by the rails at the rim (5) of the lower half of the shell.

Figure 4:
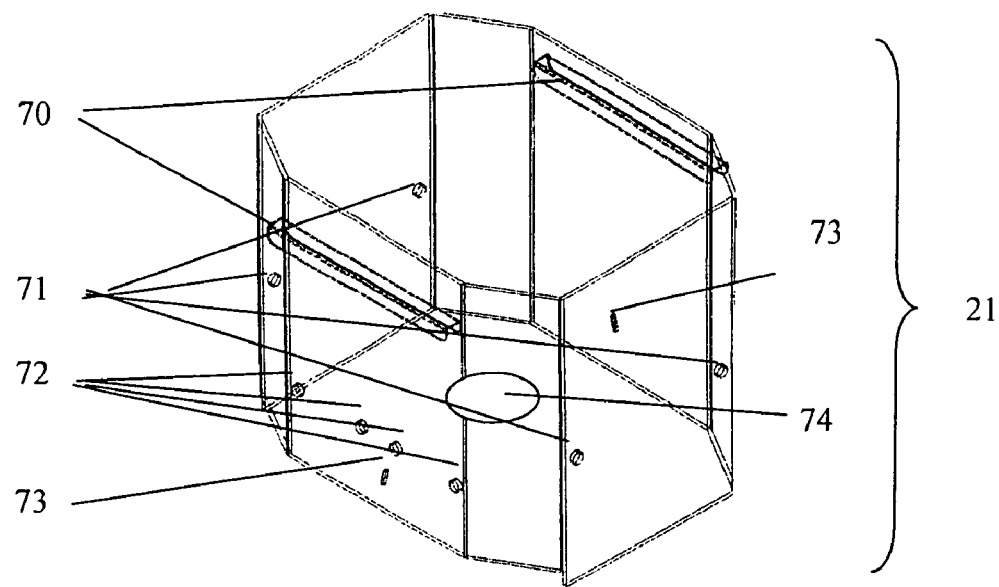
FIG. 4 is cutaway perspective view of the firebox shown separated from the barbecue shell.

Referring to FIG. 4, the firebox (21) is shown in perspective cutaway view separated from the barbecue shell. The firebox is shaped like an elongated octagon. It is comprised of heat resistant metal to withstand frequent ignition of the charcoal to flash point. On the two sides of the firebox that face toward the front and rear of the barbecue, support rails (70) are affixed by welding, integral molding, or other means at the same height on each side. These support rails correspond to the support rails affixed to the interior wall of the barbecue shell, as described in FIGS. 2 and 12. Four apertures appear in the firebox in a horizontal plane (71), which apertures serve to hold two metal rods that cross the interior of the firebox at the same elevation as the heating elements (as shown further in FIG. 7). The four apertures appearing in a horizontal line across one side of the firebox (72) provide for the heating element of the ignition unit to be inserted through the wall of the firebox. The slot apertures in two of the walls of the firebox (73) are provided to hold an air diverter on the interior below the heating element. The firebox also has an aperture in its bottom (74), through which the forced air travels into the firebox during ignition.

Figure 5:
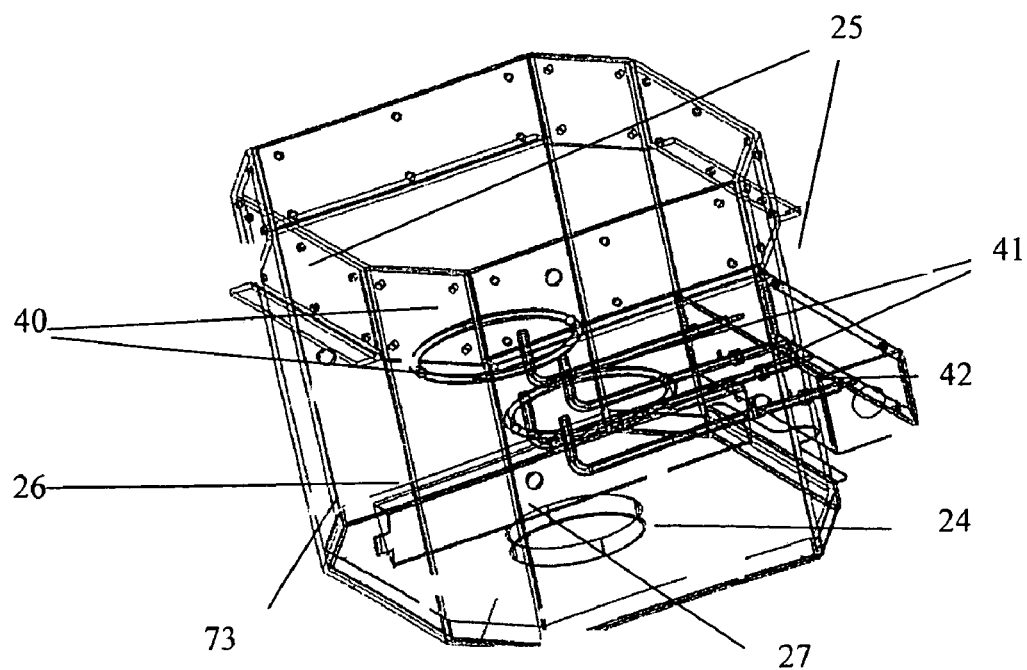
FIG. 5 is a cutaway perspective side view of the firebox showing a heating element, air diverter, and slidable ashtray.
Figure 12:
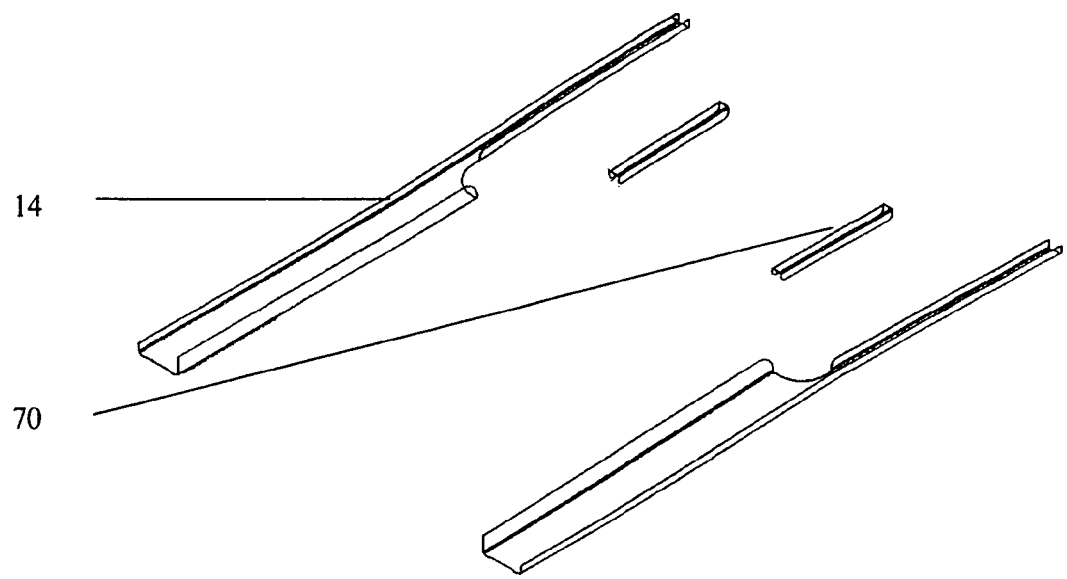
FIG. 12 is a perspective view of the supporting rails for the perforated support racks.

In FIG. 5, the firebox is illustrated in a perspective cutaway side view, displaying the support rails on the exterior of the firebox (25) that correspond to support rails affixed to the interior walls of the barbecue shell for purposes of holding the perforated support racks (see FIGS. 12). This illustration shows one embodiment of the heating elements used for the ignition process, specifically electrical heating coils (40), the electricity for which is supplied through conduits (41) that extend to the heating element electrical junction box (42), which is affixed to the exterior of the firebox at the front of the barbecue. Other heating elements could also substituted for electrical heating coils, such as gas or propane burners.

Below the heating elements (40) in FIG. 4, the air diverter (26) for the firebox is illustrated. This diverter is wedge-shaped and is affixed horizontally across the center of the firebox such that the heating elements (40) are above and to either side of the diverter. The diverter is held in place by insertion into two slot apertures (73) in the walls of the firebox. Beneath the air diverter (26) and lying on the bottom of the firebox is a slidably removable ashtray (24) having a center aperture (27) that corresponds with the center aperture in the bottom of the firebox.

During the ignition process, fuel baskets are placed above the heating element (40). This element is turned oil using a tinier relay switch, which switch activates an automated sequence timer that is operable to turn on the heating element (40). As the element heats up the charcoal, the automated sequence timer next turns on the high-pressure forced air blower to supply a high rate of air flow through the conduit and the corresponding apertures in the bottom of the firebox and ashtray (27). Said air flow will be split and guided by the wedge-shaped diverter (26) to rise directly beneath the heating elements, which in turn are directly beneath the fuel baskets. The combined high rate of air flow and high temperature will accelerate ignition of the fuel by bringing it rapidly to flash point and will further rapidly elevate the temperature of the fuel to a degree suitable for cooking. At the end of its pre-set cycle, the automated sequence timer will turn off the heating element and the high-pressure forced air supply. After the barbecue cools, the ashtray (24) can be pulled from the firebox and any waste that has fallen during ignition can be thrown out and the ashtray then replaced.

Figure 6:
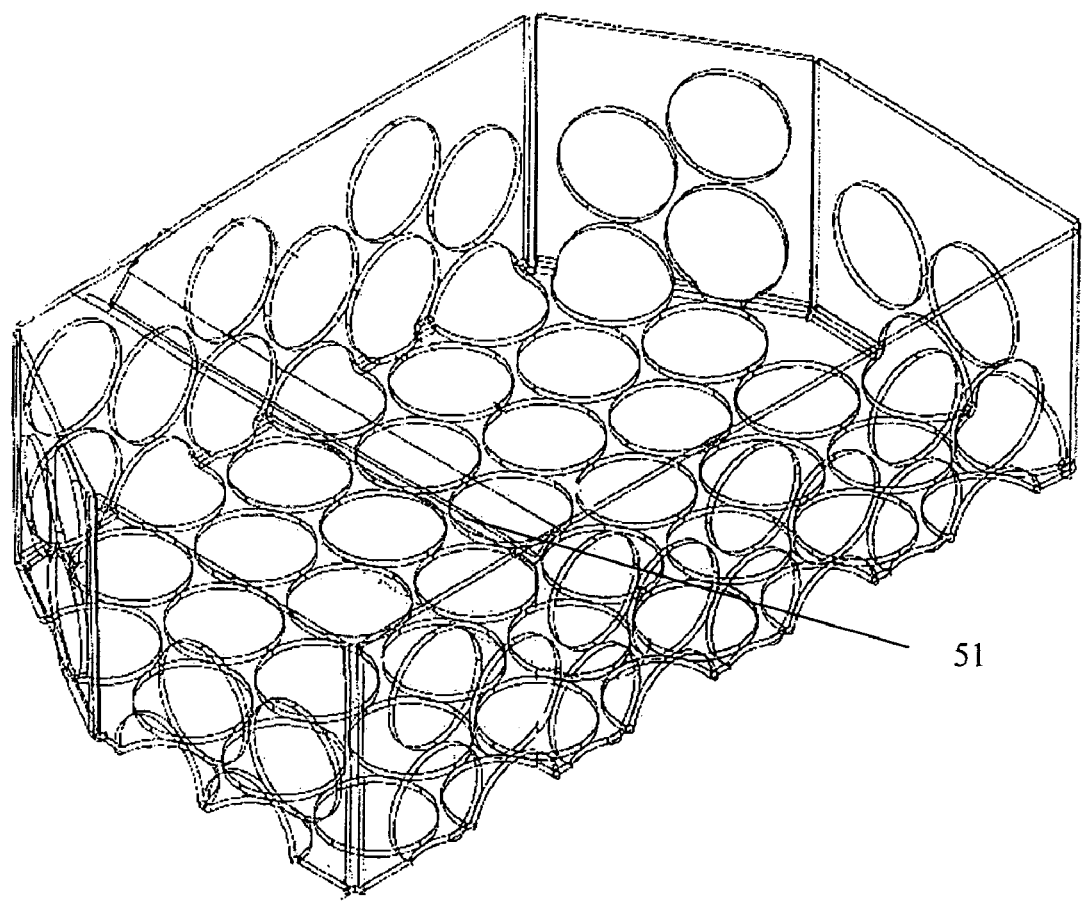
FIG. 6 is a perspective view of a perforated fuel basket.

FIG. 6 shows a perspective view of a fuel basket that is used to hold the charcoal or wood during the ignition and cooking processes. The basket is comprised of heat-resistant perforated metal such that the basket surface allows as much heat and air to move through it as possible. The basket is six-sided such that it will fit into one half of the elongated octagon of the firebox. In this way, a plurality of baskets may be placed in the firebox at one time for ignition of the fuel contained in the baskets.

At least one handle or catch (51) is attached across the top edge of the fuel basket close to an end of said basket for purposes of inserting a tool beneath the catch to lift and transfer the basket after the coals have been ignited. The placement of the catch corresponds to the length of the tool. (See FIG. 9 through 11 for further description of a tool.) The size of the perforations in this metal basket are made specifically to fit square, pillow-shaped charcoal briquettes or wood chunks, such that the briquettes or wood can protrude slightly through the perforations bringing some of them in contact with the heating element and increasing the rapidity of ignition.

Figure 7:
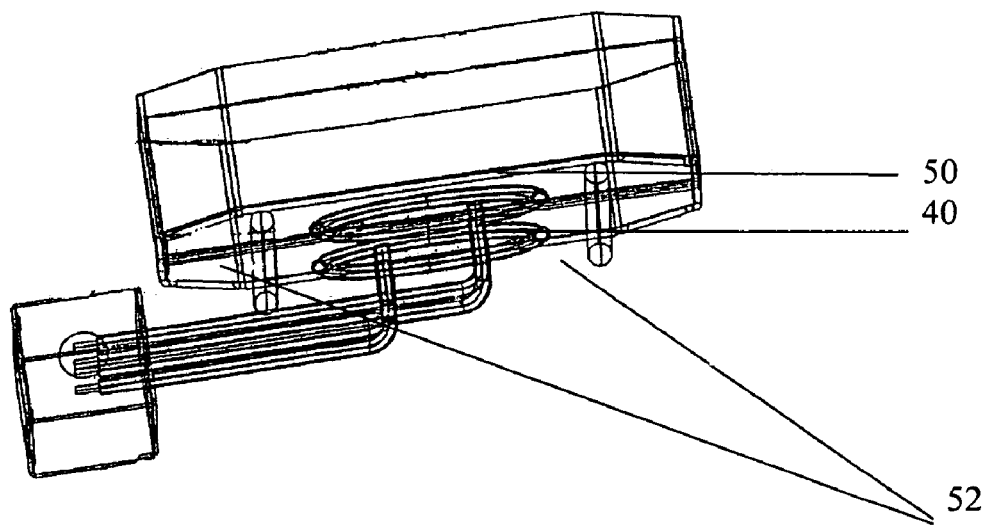
FIG. 7 is a slightly perspective side view of the fuel basket set above the heating element of the ignition component of the present invention.

Referring to FIG. 7, a heating element (40) for the firebox is shown from the side at a slight perspective, having the firebox removed in this view. This Figure illustrates placement of the fuel basket (50) immediately above the heating element. The basket can be seen to rest on two metal bars (52), which bars cross the firebox horizontally at the same elevation as the heating element and are affixed through apertures in the firebox walls (as described in FIG. 4).

Figure 8:
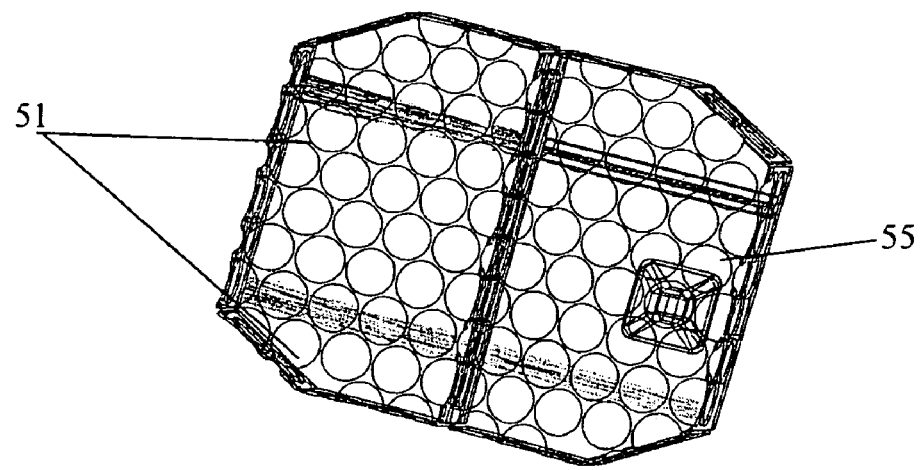
FIG. 8 illustrates two baskets placed together seen from the bottom with a briquette of charcoal inside one basket.

FIG. 8 shows a bottom view of two fuel baskets that have been placed together such that they can be set simultaneously into the firebox. In this illustration, each fuel basket is shown with two lifting catches (51) transversing the baskets near either end. A briquette of charcoal (55) is illustrated in one basket, showing how the pillow-shaped form of the briquette will protrude slightly through the perforations of the basket.

Referring to FIG. 9, a basket transfer tool is illustrated from a side view. The tool handle (60) is thick and shaped for a full-hand grip. The shaft of the tool (62) is at an approximately 90 degree angle to the handle and is specially shaped to fit into the interior spaces of the fire box and barbecue shell. The flanges at the bottom of the shaft (61) are set at angles that correspond to the angles of the sides of the fuel basket so as to hold the basket level while it is being lifted and transported. A hook at the end (64) of the tool is used to insert under and hold the catch attached to the fuel basket. The length of the span before the hook is designed to allow for maximum leverage and steadiness for purposes of lifting and transferring the fuel basket containing ignited coals.

Figure 10:
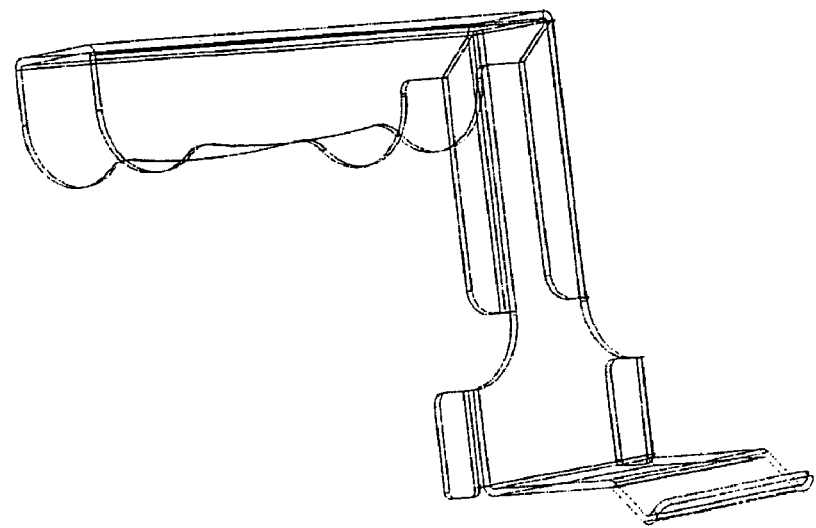
FIG. 10 is a perspective view of the basket transfer tool.

The same tool is illustrated in FIG. 10, but this time from a perspective view.

FIG. 11 illustrates use of the basket transfer tool with a fuel basket. The angled lower flanges on the shaft (61) can be seen to correspond with the angles of the basket sides. The hook on the end of tool (64) is inserted tinder the catch (51) affixed toward one end of the basket. As the basket is lifted and transported, the uniquely shaped tool surfaces serve to exert opposing pressures against the basket catch and the basket sides, such that the fuel basket can be lifted in a steady and safe motion.

In FIG. 12, a perspective view of the support rails for the perforated support racks are shown in the position as if affixed in the interior of the barbecue shell. The two long support rails (14) are attachable to the interior walls of the barbecue shell, as illustrated in FIG. 3. The shape of the support rails corresponds to the brackets for the perforated support racks. The two small support rails (70) are affixed to the exterior sides of the firebox, as illustrated in FIG. 4. The rails are aligned so as to be horizontally planar.

Figure 13:
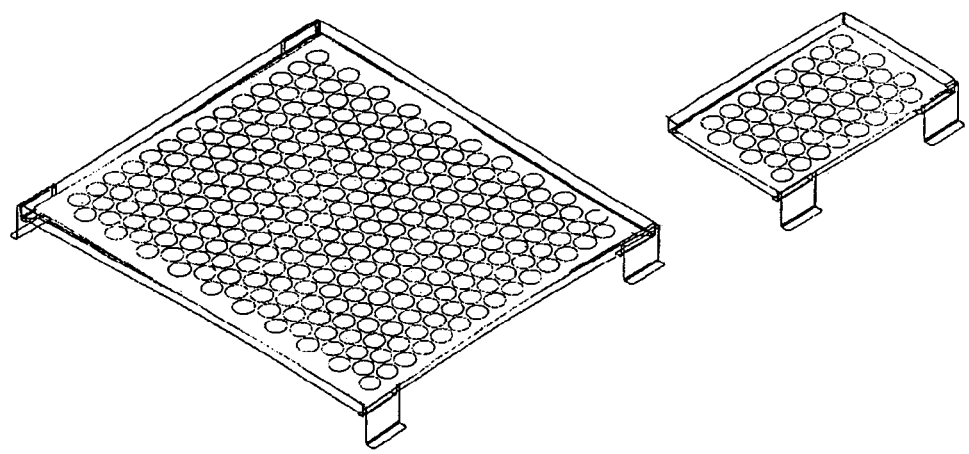
FIG. 13 is a perspective view of the large and small perforated support racks.

FIG. 13 is a perspective view of the perforated support racks that can be rested on the support rails shown in FIG. 7A. These racks may be made as a single molded, integral piece, or as several pieces welded or otherwise affixed together. The racks are comprised of heat-resistant perforated metal so as to minimize surface impeding of air and heat flow. The racks are used to support the fuel baskets during the cooking process. The perforations of the metal racks are of a slightly small circumference than the perforations of the fuel basket to keep the burning briquettes, having decreased in size since being first ignited, from falling through the rack too soon.

Figure 14:
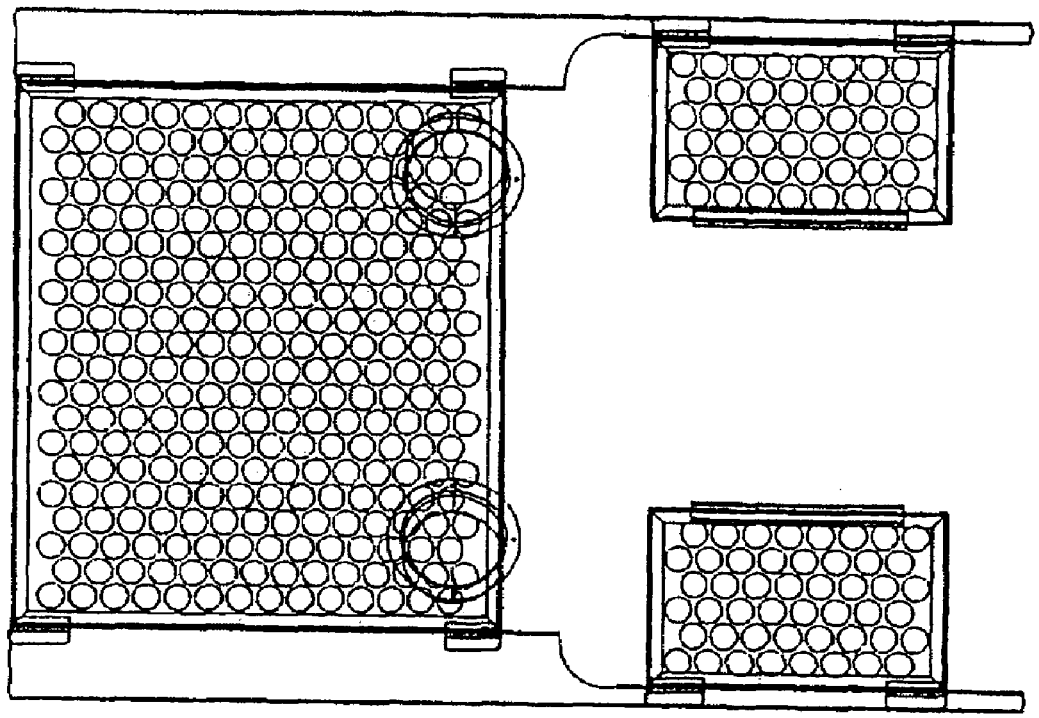
FIG. 14 shows a top view of the perforated support racks in position on the support rails.

In FIG. 14, the perforated support racks are viewed from the top. Only the support rails and racks are shown in this illustration. The firebox would be in the space between the two small racks.

Figure 15:
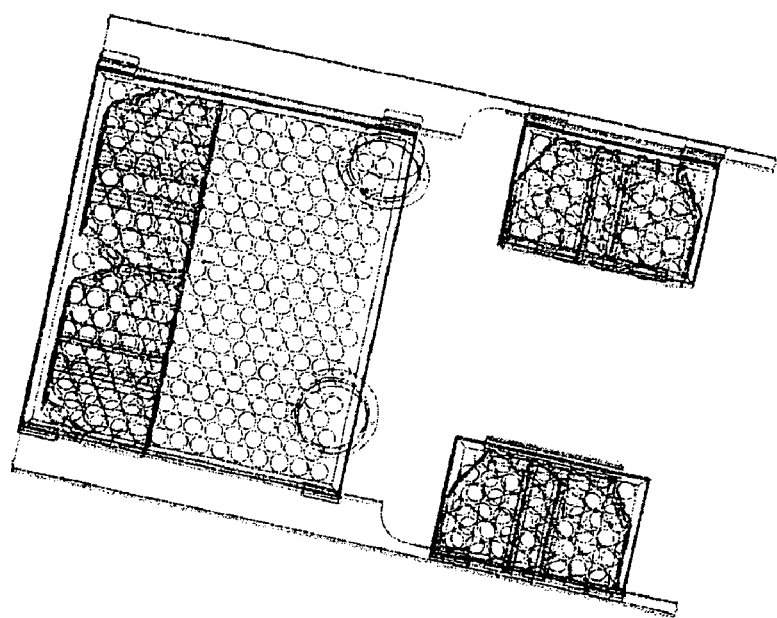
FIG. 15 is a top view of the perforated support racks holding the fuel baskets in a position for indirect cooling.

Referring to FIG. 15, a direct method of cooking food is illustrated. This Figure is in slight perspective and shows the fuel baskets positioned all together on the large perforated support rack. In this placement, the charcoal will provide direct heat for rapid cooking.

Figure 16:
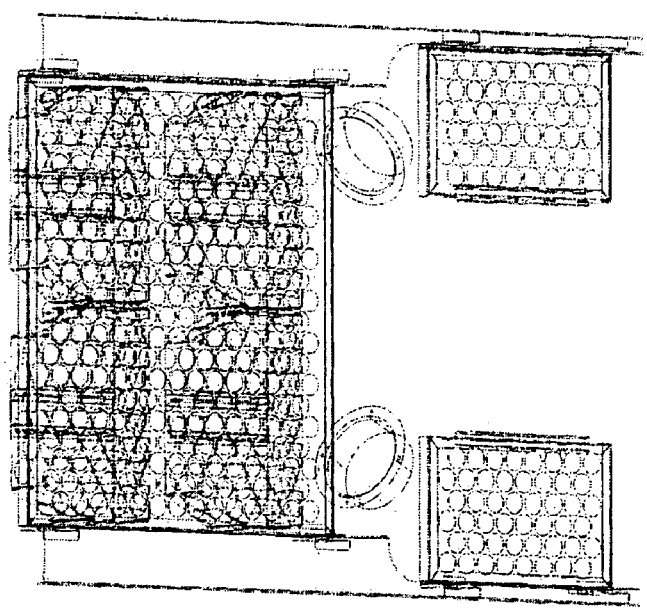
FIG. 16 is a top view of the perforated support racks holding the fuel baskets in a position for direct cooking.

In FIG. 16, a top view of the support racks is shown with the fuel baskets positioned on the small racks and at the corners of the large rack. In this position, the charcoal will produce more moderate heat for indirect cooking in the center of the cooking grill.

Figure 17:
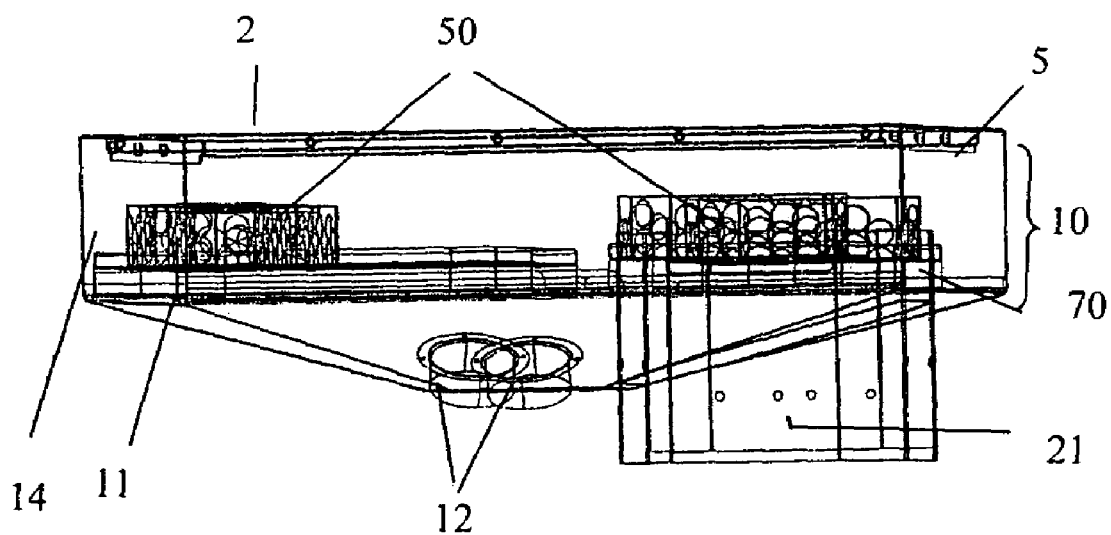
FIG. 17 illustrates a side view of the present invention with the fuel baskets placed on the support rack in the configuration for direct cooking.

FIG. 17 shows a cutaway view of the barbecue shell (10), firebox (21), fuel baskets (50), and food cooking grates (2). A plurality of grates may be placed across the opening of the unit on support brackets (5, which grates serve as the surface for cooking food. The grates are placed on the grill after the fuel baskets (50) have been positioned on the support racks (14), (70) in the center cooking area of the grill. In this illustration, the fuel baskets (50) are all placed directly below the food cooking grates (2), in which event cooking will be direct and rapid. In other configurations the baskets may be moved to positions not directly below for purposes of indirect cooking.

Figure 18:
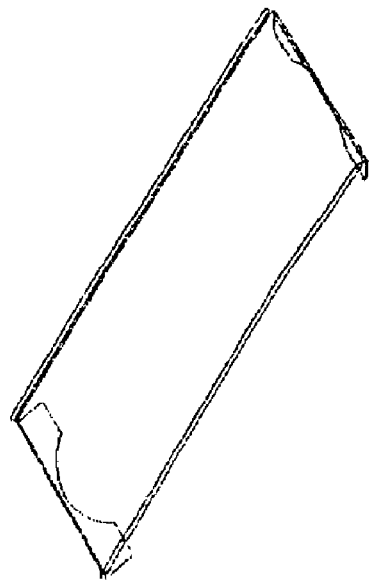
FIG. 18 is a perspective view of the low-pressure air supply ashtray and diverter.

FIG. 18 is a perspective cutaway view of the cooking air supply diverter. The arced flanges on either end of the diverter fit over the apertures for the ambient air supply located in the sloping sides of the bottom of the barbecue shell. The air supply will be drawn by the draft of the fire up through the apertures that are protected from falling waste by the diverter, and the air flow is divertable to either side, rising directly under the fuel baskets on the support racks that are in interior of the cooking area of the barbecue shell.

Figure 19:
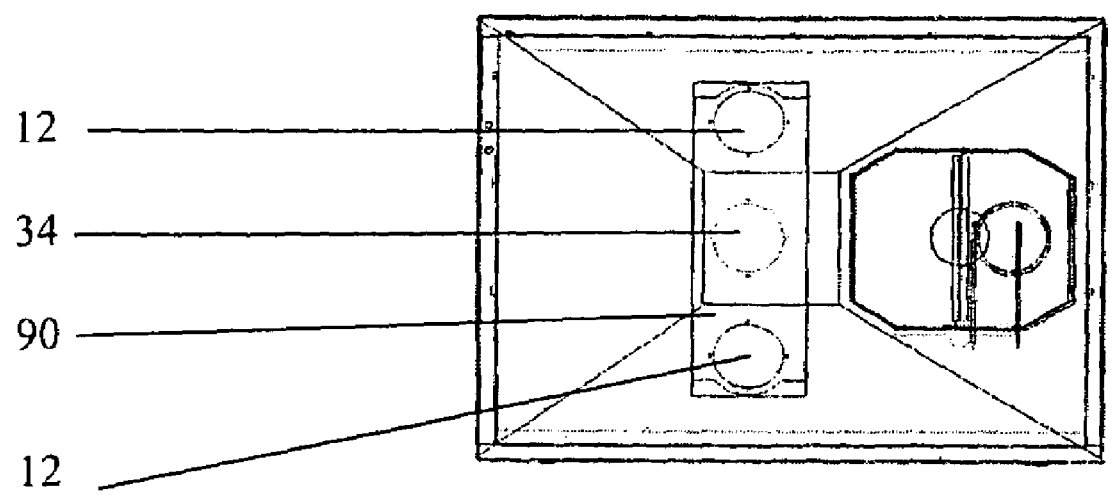
FIG. 19 shows a top view of the interior bottom of the barbecue shell with the low-pressure air supply ashtray and diverter in position.

The bottom of the barbecue shell is shown from a top view in FIG. 19. The firebox can be seen, as well as the apertures for ambient air supply (12) and the waste disposal unit (34). Transversing these apertures is an air intake diverter (90), shown in this illustration in cutaway view for purposes of seeing the apertures beneath the diverter. This diverter serves to keep waste from dropping through these holes during the cooking process. In addition, the diverter is designed to guide the flow of ambient air, which is being drawn in by the draft of the fire's heat, such that the air flow moves directly up through the burning charcoal on the support racks.

I claim:

1. A grill for cooking food comprising:
    a plurality of grill racks;
    a plurality of support racks;
    a shell, having an interior, for supporting and containing said grill racks and said support racks, in a cooking position, with said support racks being under said grill racks;
    a compartment, having an interior, for igniting solid fuel prior to cooking, said compartment being at least partially disposed within said shell, said compartment being separate and apart from said cooking position;
    a means for rapidly igniting said solid fuel;
    at least one air supply operable for rapid transmission of air to said solid fuel in a manner to effect elevation of the temperature of said fuel to a degree suitable for cooking;
    a means for conducting air from said air supply to the solid fuel;
    a holding means for holding said solid fuel while igniting said solid fuel within said compartment;
    a transferring means for transferring the holding means containing ignited solid fuel to said support racks;
    at least one of said grill racks being suitable for disposing food thereupon for cooking; and
    a means for waste processing and removal after cooking, said shell having a slanted bottom and pluggable apertures to facilitate removal of waste by rinsing with liquid through said waste means, said compartment protruding above said bottom to prevent infiltration of liquid to its interior during said rinsing.

2. A cooking grill as claimed in claim 1, wherein said holding means is comprised of perforated metal baskets shaped to correspond to the interior of said ignition compartment and to the interior of said shell.

3. A cooking grill as claimed in claim 1, wherein said solid fuel is comprised of charcoal.

4. A cooking grill as claimed in claim 1, wherein said solid fuel is comprised of wood.

5. A cooking unit as claimed in claim 1, wherein said ignition means is comprised of an at least one electric element.

6. A cooking grill as claimed in claim 1, wherein said ignition means is comprised of at least one element capable of supplying hydrocarbon gas.

7. A cooking grill as claimed in claim 1, wherein said ignition means is capable of being turned on and off by means of an automated sequence tuner operable by means of a timer relay switch.

8. A cooking grill as claimed in claim 1, wherein said ignition compartment is permanently attached to said shell.

9. A cooking grill as claimed in claim 1, wherein said ignition compartment is removably attached to said shell.

10. A cooking grill as claimed in claim 1, wherein said air supply is comprised of a portable forced air blower unit removably attached to said grill and capable of creating high-pressure and high-volume air flow operable to accelerate ignition and elevation of the temperature of said fuel to a degree suitable for cooking food.

11. A cooking grill as claimed in claim 10, wherein said means for conducting air from said air supply is comprised of a conduit through which said air passes from at least one air supply device through at least one aperture in the ignition compartment.

12. A cooking grill as claimed in claim 1, wherein at least one said air supply is comprised of an induction fan capable of creating low-pressure and low-volume air flow operable to accelerate and maintain elevation of the temperature of said fuel to a degree suitable for cooking food.

13. A cooking grill as claimed in claim 1, wherein said means for conducting air from said plurality of air supplies is comprised of at least one aperture in the shell operable as a passage for the flow of air.

14. A cooking grill as claimed in claim 13, wherein said means for conducting air from said plurality of air supplies is comprised of at least one air flow diverter placed in the interior of the shell in correspondence with said aperture.

15. A cooking grill as claimed in claim 13, wherein said means for conducting air from said plurality of air supplies is comprised of at least one air flow diverter placed in the ignition compartment of the shell in a correspondence with said aperture.

16. A cooking grill as claimed in claim 1, wherein said means for conducting air from said plurality of air supplies is comprised of at least one aperture in the ignition compartment operable as a passage for the flow of air.

17. A cooking grill as claimed in claim 1, wherein said transferring means is comprised of an angled tool insertable to a corresponding receiving element affixed to said holding means, said tool being capable of use as a handle to lift said holding means from the ignition compartment and transfer said holding means to the supporting racks.

18. A cooking grill as claimed in claim 1, wherein said racks are comprised of perforated, heat resistant metals.

19. A cooking grid as claimed in claim 1, wherein the lower walls of said shell slope inward toward the center of the shell bottom to promote drainage of waste.

20. A cooking grill as claimed in claim 19, wherein said means for waste processing further comprises a wet-dry vacuum unit attachable to said disposal unit.

21. A cooking grill as claimed in claim 19, wherein said means for waste processing further comprises conduit attachable to a plumbing drainage system for a building.

22. A cooking grill as claimed in claim 1 wherein a waste disposal tray comprised of heat-resistant metal is removably inserted through a slot at the base of the wall of the container wherein the fuel in the fuel holders is ignited, said tray being capable of resting on the interior bottom of said container and being operable to collect waste generated during fuel ignition for later removal.

23. A cooking grill as claimed in claim 1, wherein said means for waste processing comprises a garbage disposal unit.

24. A grill for cooking food comprising:
a plurality of grill racks;
a shell for supporting, and containing said grill racks;
a compartment for igniting solid fuel prior to cooking, said compartment being at least partially disposed within said shell;
a plurality of solid fuel holders for holding said solid fuel;
a means for rapidly igniting said solid fuel;
at least one air supply operable for rapid transmission of air to said solid fuel in a manner to effect elevation of the temperature of said solid fuel to a degree suitable for cooking;
a means for conducting air from said air supply to the solid fuel;
a means for transferring the ignited solid fuel to a plurality of support racks;
at least one of said grill racks being suitable for disposing food thereupon for cooking;
a means for waste processing and removal after cooking, said shell having a slanted bottom and pluggable apertures to facilitate removal of waste by rinsing with liquid through said waste means, said compartment protruding above said bottom to prevent infiltration of liquid to its interior during said rinsing; and
an angled tool insertable to a corresponding receiving element affixed to each of said solid fuel holders, said tool being capable of use as a handle to lift said solid fuel holders from the ignition compartment and transfer said solid fuel holders to the supporting racks.

25. A cooking grill as claimed in claim 24, wherein said solid fuel holder is comprised of a perforated metal basket shaped to correspond to the interior of said ignition compartment and to the interior of said shell.

26. A cooking grill as claimed in claim 24, wherein said solid fuel is comprised of charcoal.

27. A cooking grill as claimed in claim 24, wherein said solid fuel is comprised of wood.

28. A cooking grill as claimed in claim 24, wherein said ignition means is comprised of an at least one electric element.

29. A cooking grill as claimed in claim 24, wherein said ignition means is comprised of at least one element capable of supplying hydrocarbon gas.

30. A cooking grill as claimed in claim 24, wherein said ignition means is capable of being turned on and off by means of an automated sequence timer operable by means of a timer relay switch.

31. A cooking grill as claimed in claim 24, wherein said ignition compartment is permanently attached to said shell.

32. A cooking grill as claimed in claim 24, wherein said ignition compartment is removably attached to said shell.

33. A cooking grill as claimed in claim 24, wherein said air supply is comprised of a portable forced air blower unit removably attached to said grill and capable of creating high-pressure and high-volume air flow operable to accelerate ignition and elevation of the temperature of said fuel to a degree suitable for cooking food.

34. A cooking grill as claimed in claim 33, wherein said means for conducting air from said air supply comprised of a conduit through which said air passes from at least one air supply device through at least one aperture in the ignition compartment.

35. A cooking grill as claimed in claim 33, wherein said means for conducting air from said plurality of air supplies is comprised of at least one air flow diverter placed in the interior of the shell in correspondence with said aperture.

36. A cooking grill as claimed in claim 33, wherein said means for conducting air from said plurality of air supplies is comprised of at least one air low diverter placed in the ignition compartment of the shell in correspondence with said aperture.

37. A cooking grill as claimed in claim 24, wherein at least one said air supply is comprised of an induction fan capable of creating low-pressure and low-volume air flow operable to accelerate and maintain elevation of the temperature of said fuel to a degree suitable for cooking food.

38. A cooking grill as claimed in claim 24, wherein said means for conducting air from said plurality of air supplies is comprised of at least one aperture in the shell operable as a passage for the flow of air.

39. A cooking grill as claimed in claim 24, wherein said means for conducting air from said plurality of air supplies is comprised of at least one aperture in the ignition compartment operable as a passage for the flow of air.

40. A cooking grill as claimed in claim 24, wherein said racks are comprised of perforated, heat resistant metals.

41. A cooking grill as claimed in claim 40, wherein said means for waste processing further comprises a wet-dry vacuum unit attachable to said disposal unit.

42. A cooking grill as claimed in claim 40, wherein said means for waste processing further comprises conduit attachable to a plumbing drainage system for a building.

43. A cooking grill as claimed in claim 24, wherein the lower walls of said shell slope inward toward the center of the shell bottom to promote drainage of waste.

44. A cooking grill as claimed in claim 24 wherein a waste disposal tray comprised of heat-resistant metal is removably inserted through a slot at the base of the wall of the container wherein the fuel in the fuel holders is ignited, said tray being capable of resting on the interior bottom of said container and being operable to collect waste generated during fuel ignition for later removal.

45. A cooking grill as claimed in claim 24, wherein said means for waste processing comprises a garbage disposal unit.

* * * * *